US012091805B2

(12) United States Patent
Kim et al.

(10) Patent No.: US 12,091,805 B2
(45) Date of Patent: *Sep. 17, 2024

(54) LAUNDRY TREATING APPARATUS

(71) Applicant: LG Electronics Inc., Seoul (KR)

(72) Inventors: Beomjun Kim, Seoul (KR); Sangwook Hong, Seoul (KR); Woore Kim, Seoul (KR); Hongjun Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 479 days.

This patent is subject to a terminal disclaimer.

(21) Appl. No.: 17/465,313

(22) Filed: Sep. 2, 2021

(65) Prior Publication Data

US 2021/0395936 A1 Dec. 23, 2021

Related U.S. Application Data

(63) Continuation of application No. 16/537,148, filed on Aug. 9, 2019, now Pat. No. 11,136,707.

(30) Foreign Application Priority Data

Aug. 9, 2018 (KR) ........................ 10-2018-0093286

(51) Int. Cl.

| | |
|---|---|
| ***D06F 39/04*** | (2006.01) |
| ***D06F 37/26*** | (2006.01) |
| ***D06F 58/26*** | (2006.01) |
| ***H05B 6/10*** | (2006.01) |
| *D06F 23/04* | (2006.01) |
| *D06F 34/24* | (2020.01) |
| *D06F 37/12* | (2006.01) |

(Continued)

(52) U.S. Cl.

CPC ............ *D06F 39/04* (2013.01); *D06F 37/267* (2013.01); *D06F 58/26* (2013.01); *H05B 6/102* (2013.01); *H05B 6/108* (2013.01); *D06F 23/04* (2013.01); *D06F 34/24* (2020.02); *D06F 37/12* (2013.01); *D06F 2103/52* (2020.02); *D06F 2105/28* (2020.02)

(58) Field of Classification Search

CPC ........ D06F 39/04; D06F 37/267; D06F 58/26; D06F 2105/28; D06F 2103/52; D06F 34/24; D06F 23/04; D06F 37/12; H05B 6/102; H05B 6/108

USPC ............................................................. 68/16

See application file for complete search history.

(56) References Cited

U.S. PATENT DOCUMENTS

| | | | |
|---|---|---|---|
| 7,610,778 | B2 | 11/2009 | Oh et al. |
| 2006/0086000 | A1 | 4/2006 | Lee |
| 2008/0184586 | A1 | 8/2008 | Yoo et al. |

(Continued)

FOREIGN PATENT DOCUMENTS

| | | |
|---|---|---|
| DE | 102014224051 | 5/2016 |
| DE | 102016110871 | 11/2017 |

(Continued)

OTHER PUBLICATIONS

Extended European Search Report in European Appln. No. 22191375.9, dated Jan. 9, 2023, 8 pages.

(Continued)

*Primary Examiner* — Tinsae B Ayalew
(74) *Attorney, Agent, or Firm* — Fish & Richardson P.C.

(57) ABSTRACT

The present invention relates to a laundry care apparatus in which an induction module heats the drum uniformly using a magnetic field to dry laundry or heat wash-water, and center and front and rear regions of the drum are uniformly heated.

20 Claims, 16 Drawing Sheets

(51) Int. Cl.

| | |
|---|---|
| *D06F 103/52* | (2020.01) |
| *D06F 105/28* | (2020.01) |

(56) References Cited

U.S. PATENT DOCUMENTS

| | | | |
|---|---|---|---|
| 2018/0057996 | A1 | 3/2018 | Park et al. |
| 2018/0148886 | A1 | 5/2018 | Kalze et al. |
| 2019/0186068 | A1 | 6/2019 | Kim et al. |

FOREIGN PATENT DOCUMENTS

| | | |
|---|---|---|
| EP | 2100996 | 9/2009 |
| EP | 1914339 | 3/2010 |
| JP | S50-110475 | 9/1975 |
| JP | H11-216294 | 8/1999 |
| JP | 2003-288976 | 10/2003 |
| JP | 2004-135998 | 5/2004 |
| JP | 2017-525480 | 9/2017 |
| JP | 2018-183632 | 11/2018 |
| KR | 20110089944 | 8/2011 |
| KR | 101450238 | 10/2014 |
| KR | 10-2018- 0023276 | 3/2018 |
| WO | WO2018038580 | 3/2018 |

OTHER PUBLICATIONS

Extended European Search Report in European Appln. No. 19189794.1, dated Oct. 24, 2019, 10 pages.

International Search Report and Written Opinion in International Appln. No. PCT/KR2019/008839, dated Nov. 19, 2019, 12 pages.

Office Action in Japanese Appln. No. 2021-540068, dated Jul. 19, 2022, 13 pages (with English translation).

Office Action in European Appln. No. 19189794.1, dated Mar. 23, 2022, 6 pages.

Notice of Allowance in U.S. Appl. No. 16/537,148, dated Jun. 3, 2021, 10 pages.

LAUNDRY TREATING APPARATUS

CROSS-REFERENCE TO RELATED APPLICATIONS

This application is a continuation of U.S. application Ser. No. 16/537,148, filed on Aug. 9, 2019, which claims the benefit of Korean Patent Application No. 10-2018-0093286, filed on Aug. 9, 2018. The disclosures of the prior applications are incorporated by reference in their entirety.

TECHNICAL FIELD

The present disclosure relates to a laundry treating apparatus.

BACKGROUND

Generally, a laundry treating apparatus includes various types of laundry treating apparatuses such as a washing machine for washing clothes, a drying machine for drying purpose, and a refresher for refreshing purposes.

In the laundry treating apparatus, a washing cycle refers to a process of removing contaminants from clothes by using water and detergent and using mechanical action. A drying cycle refers to the process of removing moisture from wet laundry.

During the washing process, when washing with high-temperature washing water is carried out, more detergent can be dissolved so that contaminants on the laundry can be more easily removed therefrom and at the same time, the laundry can be sterilized. Thus, it is preferable to wash the clothes by raising the temperature of the washing water within a range such that heat does not permanently deform (for example, shrinkage, twisting, waterproof function loss, etc.) the laundry.

Conventionally, in order to increase the temperature of the washing water in contact with laundry, it was common that hot water is supplied from the outside of the laundry treating apparatus or that the washing water contacts a heating wire installed inside the laundry treating apparatus and the heated water is supplied to the tub.

When receiving the hot water from the outside, there is a problem that energy is wasted because an external boiler must be operated separately. Further, the method of using the heating wire installed inside the laundry treating apparatus requires that the heating wire should be kept immersed in the washing water. Thus, there is a structural limitation that a separate flow path must be provided under the tub.

Further, in the drying process, it is general to use a hot air based drying method in which laundry is dried by heating air circulating through the conventional tub and an external circulation channel. Further, a method has been used in which a heating wire is disposed on a flow path through which air circulates to heat the air.

In order to use the hot air drying method as described above, a gas heater or an electric heater capable of heating a heating wire is required. However, the gas heater may have problems with safety and exhaust gases. Further, in the electric heaters, foreign substances such as scales may be accumulated thereon and excessive energy may be consumed.

Further, in addition to the hot air drying method as described above, there is a low temperature dehumidifying drying method using a heat pump. The heat pump uses the cooling cycle of the air conditioner in a reverse manner. Thus, the heat pump requires an evaporator, a condenser, an expansion valve and a compressor. A condenser may be used in an indoor unit to cool indoor air in an air conditioner. However, In the heat pump based drying machine, the air is heated in the evaporator to dry the clothes. However, the heat pump has a bulky structure, a complicated structure, and a high production cost as compared with other hot air supply structures.

Further, another problem of the hot air drying method and the low temperature dehumidifying drying method is that since those methods are an indirect drying method using air, there is a disadvantage that the drying time may be prolonged when the laundry is entangled or twisted with each other or contains a large amount of water.

These various laundry treating apparatuses have advantages and disadvantages derived from the electric heaters, gas heaters and heat pumps as heating means. As new heating means that can further employ the above merits of the conventional heating means and compensate for the disadvantages thereof, induction heating means is set forth. The laundry treating apparatus using the induction heating have been provided from Japanese Patent Number JP2001070689 and Korean Patent Number KR10-922986.

These prior arts, however, only disclose basic concepts of induction heating in the washing machine. In those prior arts, there is no specific suggestion or disclosing of detailed components of the induction heating module, the connection relationship and operations thereof with the basic components of the laundry treating apparatus, approaches for securing the efficiency and safety of the induction heating, etc.

A coil is wound around an induction heating module provided in the laundry treating apparatus such as a washing machine and a drying machine. Then, the heat can be transferred to a to be heated object (drum of the washing machine) via an induction current generated by applying a current to the coil.

When the laundry treating apparatus is driven, the to-be-heated object (the drum of the washing machine) rotates and performs washing and drying of laundry stored in the drum. At this time, due to the vibration generated by the rotation of the drum, the components constituting the induction heating module can be removed therefrom. In particular, when the coil as wound is removed therefrom, various problems such as a decrease in efficiency of the induction heating module and a deterioration of the coil may occur.

Therefore, it is necessary to provide a variety of specific technical ideas for enhancing efficiency and ensuring safety and for stably winding and fixing the coil in the laundry treating apparatus employing the induction heating principle.

SUMMARY

One purpose of the present disclosure is to provide a laundry treating apparatus that can directly heat the drum to heat the washing water or dry the laundry.

Another purpose of the present disclosure is to provide a laundry treating apparatus that can shorten laundry drying time by heating the drum directly.

Another purpose of the present disclosure is to provide a laundry treating apparatus that improves drying efficiency by uniformly heating the center and front and rear regions of the drum.

Another purpose of the present disclosure is to provide a laundry treating apparatus which can prevent the coil from being removed therefrom via vibration by increasing the heat-fused amount of the coil wound on the induction heating module.

Another purpose of the present disclosure is to provide a laundry care apparatus that allows the coil to be coiled onto a coil base at a uniform density to perform uniform heating of the drum.

Another purpose of the present disclosure is to provide a laundry treating apparatus with an induction heating module for uniformly and stably heating the drum.

Another purpose of the present disclosure is to provide a laundry treating apparatus which ensures that the coil is stably installed in the induction heating device so that the coil is not removed therefrom via the vibration of the washing machine.

Another purpose of the present disclosure is to provide a laundry treating apparatus with an induction heating module having a stable coiled relationship between the coil and a component around which the coil is wound.

In a first aspect of the present disclosure, there is provided a laundry treating apparatus comprising: a cabinet; a drum made of a metal material and disposed into the cabinet, wherein the drum accommodates laundry therein; and an induction module spaced apart from an outer circumferential face of the drum by a predetermined spacing, wherein the induction module has a coil formed by turns of a wire, wherein the induction module inductively heats the drum using a magnetic field generated by applying a current to the coil, wherein the induction module includes a rectangular shaped base housing for accommodates the coil, wherein the base housing has straight sections and corner sections, wherein the base housing includes ribs protruding upwards from the base housing to define a slot for accommodating the coil therein, wherein a thermal-fusing line for thermally fusing the ribs is defined in each of the corner sections, wherein the thermal-fusing line extends across each corner section.

In one implementation of the first aspect, the thermal-fusing line extends radially across each corner section.

In one implementation of the first aspect, the thermal-fusing line extends between start and end points of each corner section.

In one implementation of the first aspect, the induction module includes a permanent magnet disposed on a top face of the coil, wherein the thermal-fusing line extends in a length direction of the permanent magnet.

In one implementation of the first aspect, the thermal-fusing line extends along an inner space of a permanent magnet mount in which the permanent magnet is received.

In one implementation of the first aspect, the base housing includes: a slot base on which the coil is seated; the ribs extending upwards from the slot base, wherein the slot is defined by the slot base and the ribs.

In one implementation of the first aspect, a protruding height of each of the ribs is larger than a thickness of the coil.

In one implementation of the first aspect, a spacing between neighboring ribs is smaller than a diameter of the wire such that the wire is press-fitted into the spacing.

In one implementation of the first aspect, a thickness of each of the ribs in each corner section is greater than a thickness of each of the ribs in each straight section.

In a second aspect of the present disclosure, there is provided a laundry treating apparatus comprising: a cabinet; a drum made of a metal material and disposed into the cabinet, wherein the drum accommodates laundry therein; and an induction module spaced apart from an outer circumferential face of the drum by a predetermined spacing, wherein the induction module has a coil formed by turns of a wire, wherein the induction module inductively heats the drum using a magnetic field generated by applying a current to the coil, wherein the induction module includes a rectangular shaped base housing for accommodates the coil, wherein the base housing has straight sections and corner sections, wherein the induction module includes a permanent magnet disposed on a top face of the coil, wherein the base housing includes ribs protruding upwards from the base housing to define a slot for accommodating the coil therein, wherein a thickness of each of the ribs in each corner section of the base housing is equal to a spacing between adjacent wires in each corner section.

In one implementation of the second aspect, the straight sections includes: transverse straight portions including a front straight portion adjacent to a front of the outer circumferential face of the drum and a rear straight portion adjacent to a rear of the outer circumferential face of the drum; and longitudinal straight portions extending perpendicularly to the transverse straight portions, wherein each corner section includes a curved section extending between each of the transverse straight portions and each of the longitudinal straight portions.

In one implementation of the second aspect, a length of an outermost wire of each longitudinal straight portion is larger than a length of an outermost wire of each transverse straight portion.

In one implementation of the second aspect, an outermost wire of the front straight portion and an outermost wire of the rear straight portion are respectively spaced apart from a frontmost portion of the drum and a rearmost portion of the drum at a predetermined spacing.

In one implementation of the second aspect, the predetermined spacing is in a range of 10 to 20 mm.

In one implementation of the second aspect, the base housing includes base fastening portion extending outwardly from both sides of the base housing to fix the base housing to the outer circumferential face of the drum such that a predetermined spacing is maintained therebetween.

In one implementation of the second aspect, each of the base fastening portions protrudes outwardly from each of both sides of the base housing, wherein each base fastening portion has a base fastening hole into which a fastener is inserted.

In one implementation of the second aspect, the base housing has a curved shape corresponding to the outer circumferential face of the drum, wherein the wire is wound along the curved shape of the base housing.

In one implementation of the second aspect, the induction module includes a permanent magnet disposed on a top face of the coil, wherein the permanent magnet is oriented to be perpendicular to a length direction of the coil to concentrate direction of the magnetic field generated by the coil onto a direction toward the drum.

In some implementations, the permanent magnet includes a plurality of permanent magnets arranged to be spaced apart from each other in a length direction of the coil.

In one implementation of the second aspect, the plurality of permanent magnets include rod shaped magnets having the same length, wherein the coil includes: longitudinal ends including a front end adjacent to a front of the drum and a rear end adjacent to a rear of the drum; and a central portion located between the longitudinal ends, wherein an area of the central portion is larger than areas of the front and rear ends, wherein the plurality of permanent magnets are arranged such that a number of the permanent magnets in the front end or rear end is larger than or equal to a number of the permanent magnets in the central portion.

The features of each of the above-described embodiments may be implemented in combination in other embodiments as long as they are not contradictory to each other or exclusive in other embodiments.

One embodiment of the present disclosure provides an effect of heating the drum directly to shorten the washing-water heating time and laundry drying time.

One embodiment of the present disclosure provides an effect to uniformly heat the center and front and rear regions of the drum to improve washing-water heating efficiency and drying efficiency.

Further, one embodiment of the present disclosure provides an effect of using the geometry of the coil base corners to secure the thickness of the ribs such that the heat-fused amount of the coil can be increased to improve the installation stability.

Further, one embodiment of the present disclosure provides an effect of preventing the coil from being detached from the coil base due to vibration generated when the laundry treating apparatus is operated.

Further, one embodiment of the present disclosure provides an effect of carrying out the heat fusion at the corner portion of the base to prevent the coil from being spaced therefrom and of carrying out the heat fusion of the coil inwardly of the ferrite slot mounted on the corner thereof to secure the heat-fused amount of the coil sufficiently.

DETAILED DESCRIPTION

Hereinafter, embodiments will be described in detail with reference to the accompanying drawings.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

Further, the configuration as described below are for the purpose of illustrating an embodiment of the present disclosure, and are not intended to limit the scope of the present disclosure.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms “comprises”, “comprising”, “includes”, and “including” when used in this specification, specify the presence of the stated features, integers, operations, elements, and/or components, but do not preclude the presence or addition of one or more other features, integers, operations, elements, components, and/or portions thereof. It will be understood that when an element or layer is referred to as being “connected to”, or “coupled to” another element or layer, it can be directly on, connected to, or coupled to the other element or layer, or one or more intervening elements or layers may be present.

Figure 1:
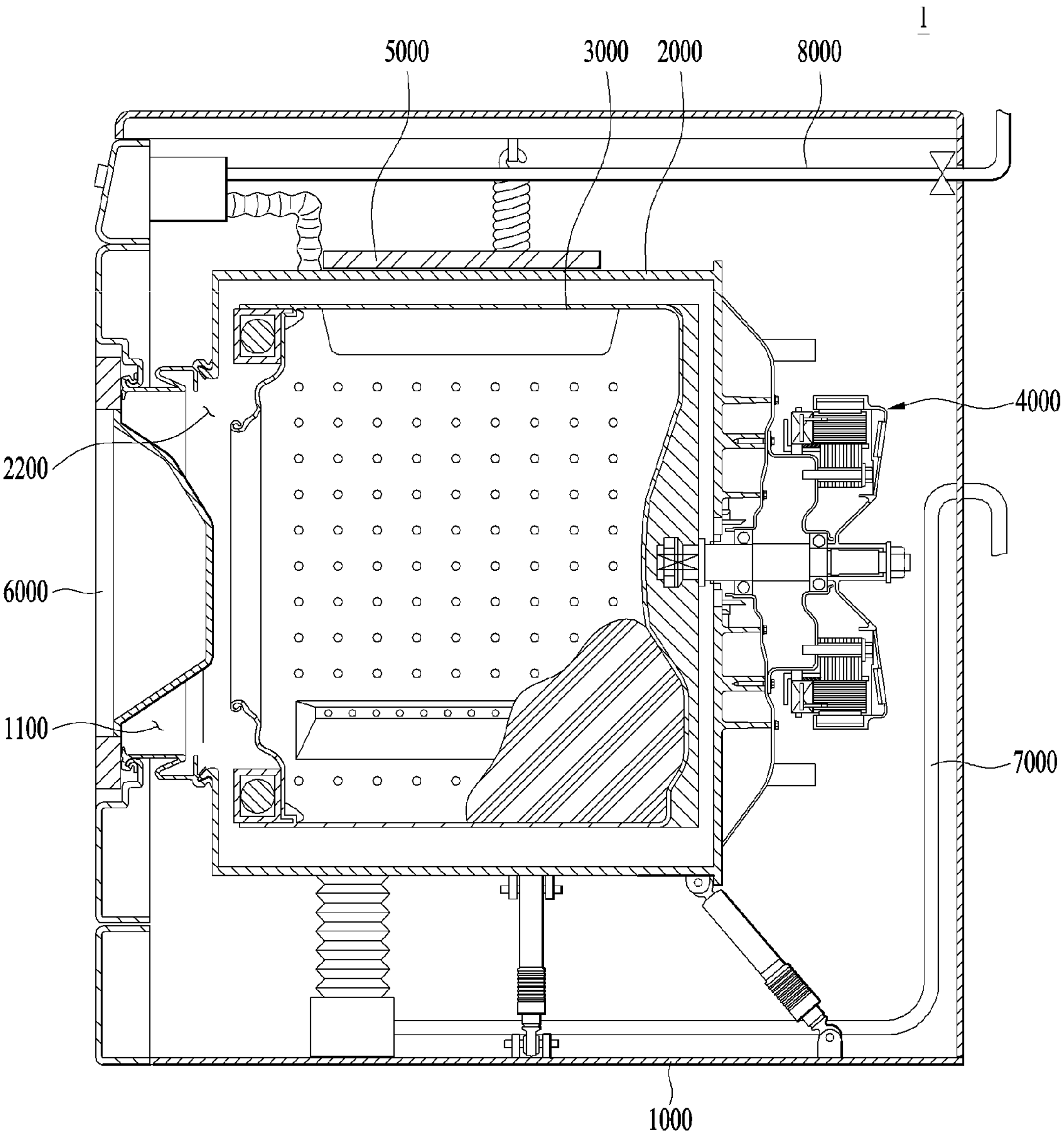
FIG. 1 shows an overall configuration of a washing machine according to the present disclosure.
Figure 2A:
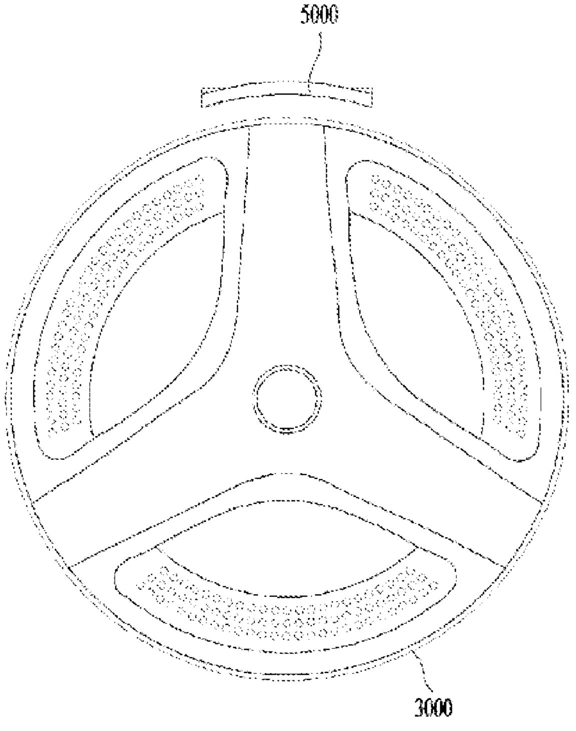
FIGS. 2A and 2B show front and side views of an induction module and a drum.
Figure 2B:
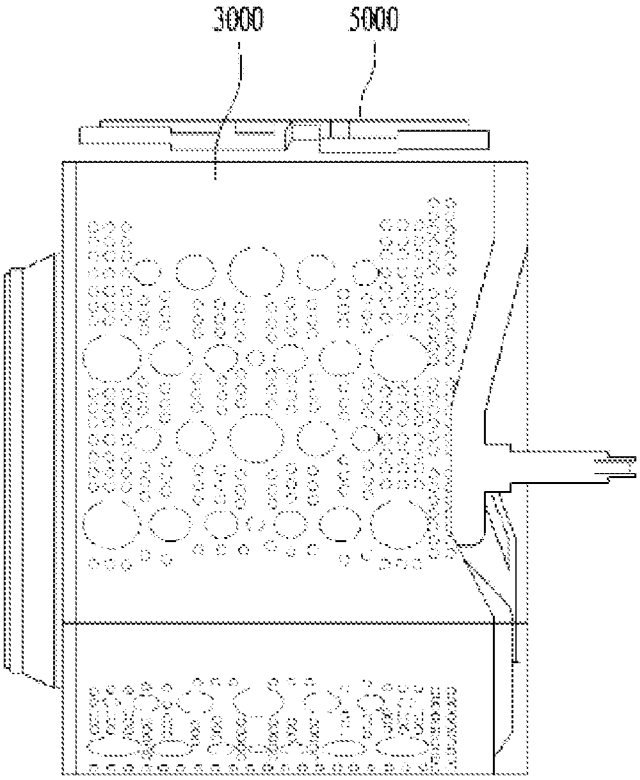

Referring to FIGS. 1 to 2B, a preferred embodiment of the laundry treating apparatus according to the present disclosure is described. First, the overall configuration of the laundry treating apparatus 1 will be described.

The laundry treatment apparatus of the present embodiment may include a cabinet 1000 forming an outer appearance, a tub 2000 installed inside the cabinet, and a drum 3000 rotatably installed inside the tub 2000 and accommodating laundry therein. The illustrated embodiment relates to a washing machine, in which washing water is stored in the tub 2000, and washing may be performed using a drum installed in the tub 2000.

When the laundry treating apparatus of this embodiment is applied to the drying machine, laundry may be accommodated inside the drum and thus the tub may be omitted.

FIG. 1 shows the overall configuration of the laundry treating apparatus.

The laundry treating apparatus 1 may include a cabinet 1000 forming an appearance of the laundry treating apparatus 1 and having a laundry inlet 1100 defined therein, a tub 2000 located in the cabinet 1000 and having an opening 2200 communicating with the laundry inlet 1100, a drum 3000 installed inside the tub 2000 and made of metal and accommodating laundry therein, a door 6000 hinge-coupled to the cabinet 1000 to allow entry and withdrawal of laundry, and an induction module 5000 to heat the drum 3000 with a magnetic field.

The tub 2000 may be located inside the cabinet 1000 by means of a spring provided on the top face inside the cabinet 1000 and a damper 1200 provided on the bottom face inside the cabinet 1000 as shown in FIG. 1.

Alternatively, the tub 2000 may be fixed to the bottom face inside the cabinet 1000 via a rear support portion (not shown) which is bent and extended downwardly of the tub 2000 and in rear of the tub 2000, and a suspension (not shown) connected to the rear support portion and having a spring and a damper. In this case, the rear portion of the tub 2000 may be inclined at a predetermined angle in the cabinet 1000.

The drum 3000 is provided to rotate within the tub 2000. In this connection, a driver 4000 for rotating the drum 3000 may be installed behind the tub 2000. When the drum 3000 rotates and moves inside the tub 2000, vibration is transmitted to the tub 2000. Therefore, the structures mounted on the tub 2000 also vibrate together. A detailed description of the problems caused by the vibration, and solutions to the problems will be given later.

Further, the tub 2000 may have a water supply pipe 8000 therein when washing water is supplied thereto. The water supply pipe 8000 may be constructed to communicate with the tub 2000 through a detergent box D provided in the cabinet 1000. Using this configuration, the detergent used in the washing process during the washing water supplying may be supplied to the tub 2000.

Further, the tub 2000 may further include a water discharge pipe 7000 for discharging wash-water stored therein. When the drainage starts, the washing-water is drained from the bottom of the tub and drained out of the laundry treating apparatus 1 via the water discharge pipe 7000 by a drain pump (not shown).

In the laundry treating apparatus 1 having a washing function, the washing water may need to be hot in the washing water temperature range that the heating does not cause permanent damage of the laundry (for example, shrinkage, twisting, waterproofing loss, etc.). To this end, a heating structure is needed to increase the washing-water temperature.

Further, both the laundry treating apparatus 1 having both a washing function and the drying function and the laundry treating apparatus 1 having only a drying function need a heating structure for drying laundry.

Thus, the laundry treating apparatus is provided with the induction module 5000, which may be used for heating the washing-water or for drying.

Referring to FIGS. 2A and 2B, the principle of heating the drum 3000 using the induction module 5000 is described.

Figure 3A:
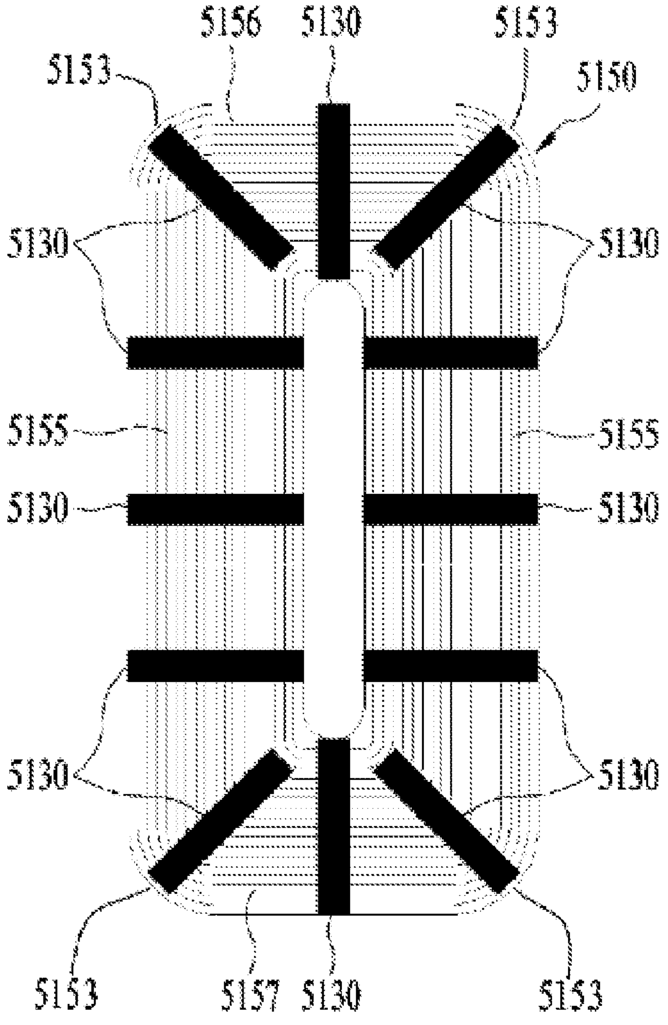
FIGS. 3A and 3B are top views showing an arrangement of a coil and a permanent magnet.
Figure 3B:
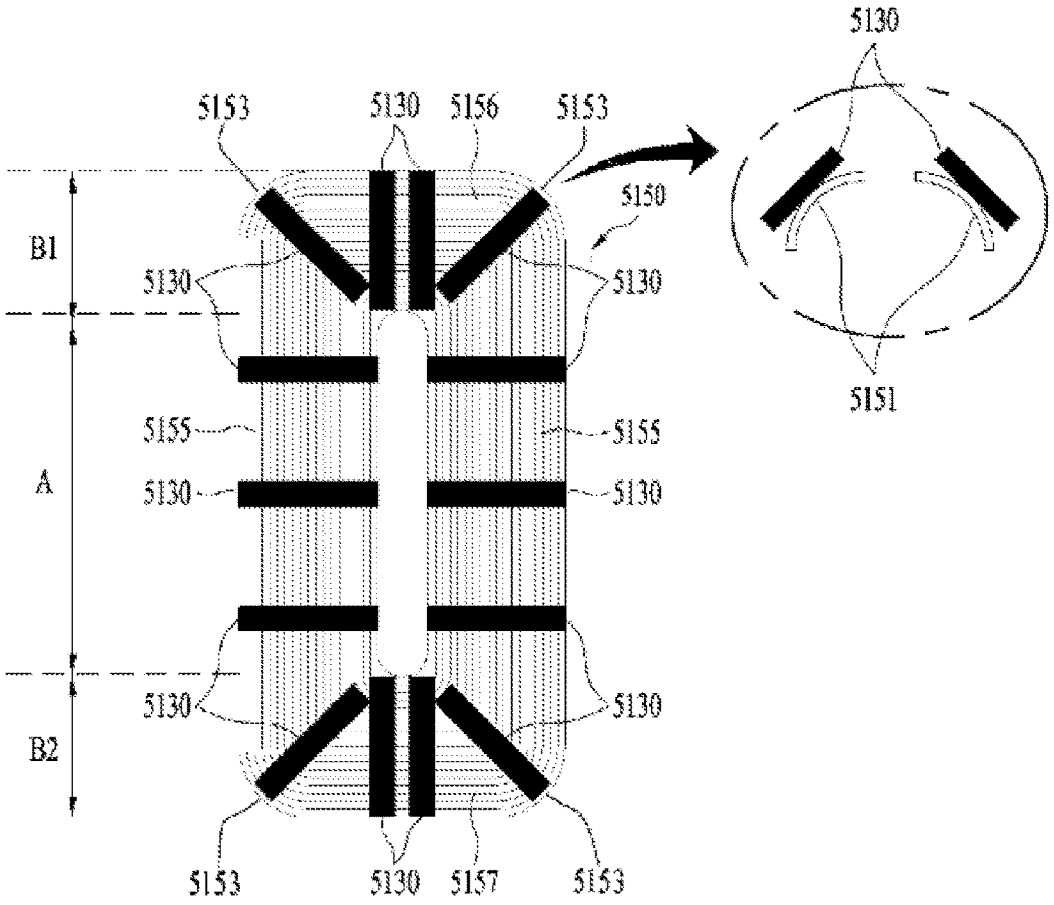

The induction module 5000 is mounted on the outer surface of the tub 2000. The induction module may heat the circumferential surface of the drum 3000 using a magnetic field generated by applying current to a coil 5150 as turns of a wire 5151. A shape of the wire and coil is shown in FIGS. 3A and 3B.

However, as described above, in the drying machine in which washing with water is not performed, the tub may be omitted. Thus, in the induction module in the drying machine, a frame or bracket for mounting the induction module thereto may replace the role of the tub. The frame or bracket may be a component that spaces the induction module apart from the drum by a predetermined distance.

The wire 5151 may include a core and a coating surrounding the core. The core may be a single core. In another example, a plurality of cores may be twisted to form a single core. Therefore, it may be said that the thickness or the wire diameter of the wire 5151 is determined by the thickness of the core and the thickness of the coating.

Hereinafter, how the coil 5150 heats the drum 3000 will be set forth. An AC current having change in the phase of the current flows to the coil 5150 located outside the circumferential surface of the drum. According to the Ampere circuit law, the coil 5150 generates a radial alternating magnetic field.

This alternating magnetic field is concentrated on the drum 3000 as a conductor with a high magnetic permeability. In this connection, the permeability refers to a degree at which a medium is magnetized based on a given magnetic field. In this connection, according to Faraday's law regarding the induction, eddy current is formed on the drum 3000. This eddy current flows in the drum 3000 made of a conductor and is converted into a Joule heat due to the resistance of the drum 3000 itself. As a result, the inner wall of the drum 3000 is directly heated.

When the inner wall of the drum 3000 is directly heated, the air temperature inside the drum 3000 and the temperature of the laundry contacting the inner wall of the drum 3000 increase. As a result, the laundry may be heated directly, which makes it possible to dry more quickly the laundry than in the indirect heating type hot air drying method or the low temperature dehumidifying drying method.

In addition, in the laundry treating apparatus 1 having the washing machine function, the washing-water can be heated without having a separate heating line and a flow path. The washing-water may continuously contact the outer wall of the drum 3000. Therefore, it is possible to heat the washing-water faster than in the method of forming a separate channel and a heat line beneath the tub.

Referring to FIGS. 3A to 4B, a preferred embodiment of a shape of the coil is described.

Figure 4A:
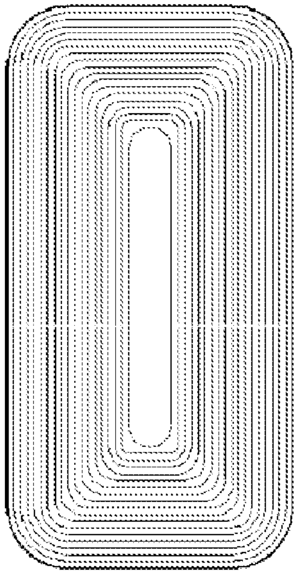
FIG. 4A shows a coil with the same radius of curvature in a curved portion.
Figure 4B:
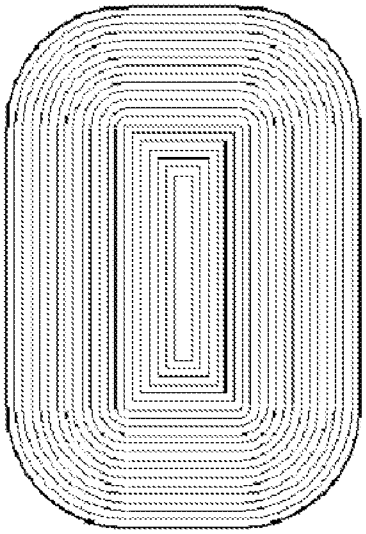
FIG. 4B shows a coil with different curvature radii in a curved portion between inner and outer coils.

FIGS. 3A and 3B show a top face of the coil 5150 as the wire 5151 wound on the outer circumferential face of the tub 2000. FIGS. 4A and 4B show various coil shapes.

The coil 5150 may be formed by coiling the wire 5151 around the outer circumferential face of the tub 2000, for example, in a concentric circle, ellipse, or track shape. The shape of the coil may not be limited to the specific shape. Depending on the winding pattern, the intensity of heating of the drum 3000 may vary.

When the curvature radius of the curved portion is constructed such that the inner coil and the outer coil have the different curvature radii as shown in FIG. 4B, the amount of the magnetic field transmitted to the center of the drum 3000 and the amount of the magnetic field transmitted to the front and rear region of the drum 3000 may be different significantly from each other.

In other words, since the area of the coil corresponding to the front and rear regions of the drum 3000 is small, the amount of the magnetic field transmitted to the front region of the circumferential surface of the drum 3000 is relatively small. Since the area of the coil corresponding to the central region A of the drum 3000 is large, the amount of the magnetic field transmitted to the center region of the circumferential surface of the drum 3000 is relatively large. Therefore, it is difficult to uniformly heat the drum 3000.

Thus, the coil 5150 may be constructed such that the wire 5151 is wound along the straight portions 5155, 5156, and 5157 and the curved portions 5153, as may be seen in FIG. 4A. It is preferable that the radius of curvature of the wire 5151 forming the curved portion 5153 may be the same between the inner coil and the outer coil.

The area of the coil at each of the corners of the coil in FIG. 4A and the area of the coil at each of the corners of the coil in FIG. 4B may be significantly different from each other.

When describing in more detail the relationship between the straight portions 5155, 5156, and 5157 and the curved portions 5153, the straight portions 5155, 5156 and 5157 may include transverse straight portions 5156 and 5157 including a front straight portion 5156 provided in a front region of the outer circumferential face of the tub 2000 and a rear straight portion 5157 provided in a rear region of the outer circumferential face of tub 2000, and a longitudinal straight portion 5155 extending perpendicularly to the transverse straight portions 5156 and 5157. Each of the curved portions 5153 may be formed at the point where the transverse straight portions 5156 and 5157 and the longitudinal straight portion 5155 meet with each other.

That is, the coil may be composed of the front straight portion 5156, the rear straight portion 5157, the both longitudinal portions 5155, and the four curved portions 5153 formed between the straight portions 5155, 5156, and 5157 and having the same radius of curvature.

According to the configuration as described above, the transverse dimensions of the coil longitudinal ends B1 and B2 including the coil front end adjacent to the front of the tub 2000 and the coil rear end adjacent to the rear of the tub, and the transverse dimension of the coil central region A located between the coil longitudinal ends B1 and B2 may be the same.

As a result, the amount of magnetic field radiated from the longitudinal ends B1 and B2 of the coil to the front and back of the circumference of drum 3000, and the amount of magnetic field radiated from the central region A of the coil to the center of the circumference of the drum 3000 may be substantially equal to each other.

Therefore, the effect that the drum 3000 may be uniformly heated in both the center region and the front and rear region of the circumferential surface thereof can be obtained.

Figure 5A:
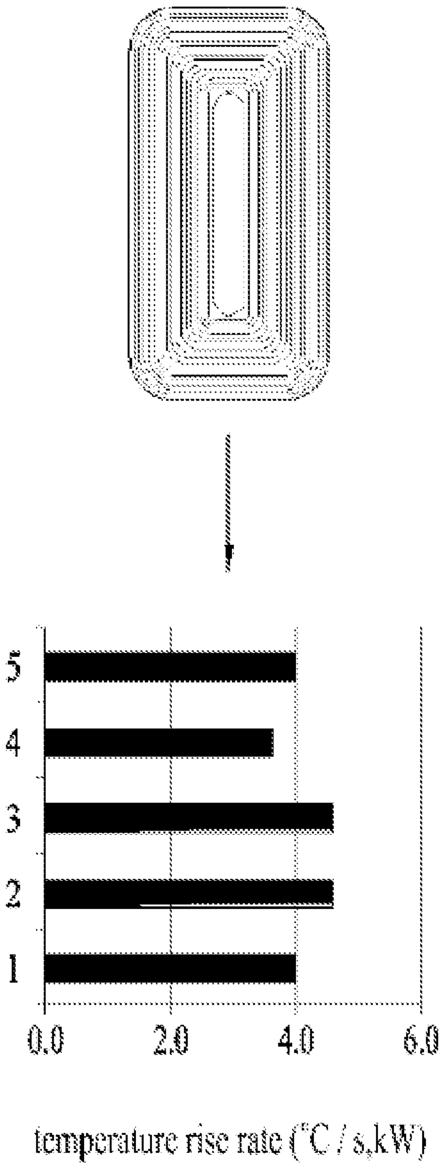
FIGS. 5A to 5C are graphs showing a temperature rise rate based on a location of a drum according to a shape of a base housing on which the coil is mounted.
Figure 5B:
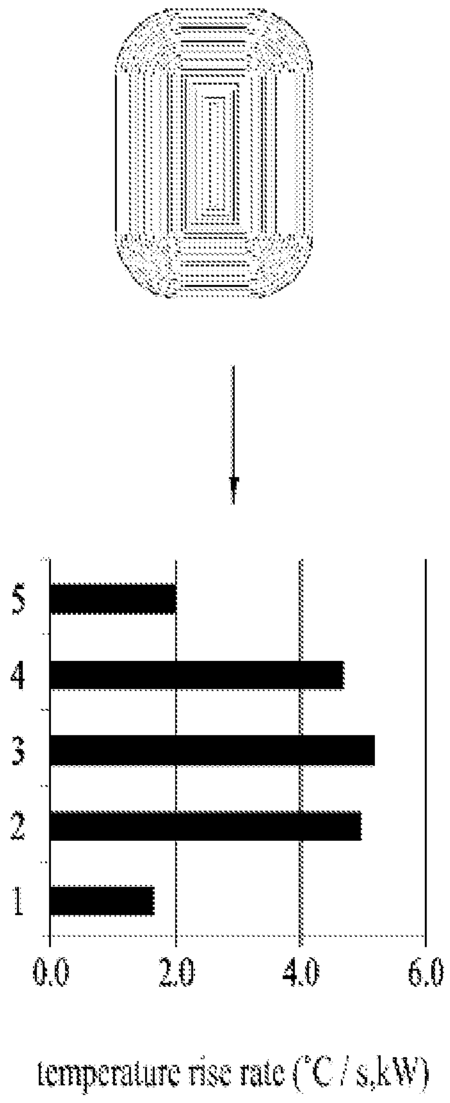
Figure 5C:
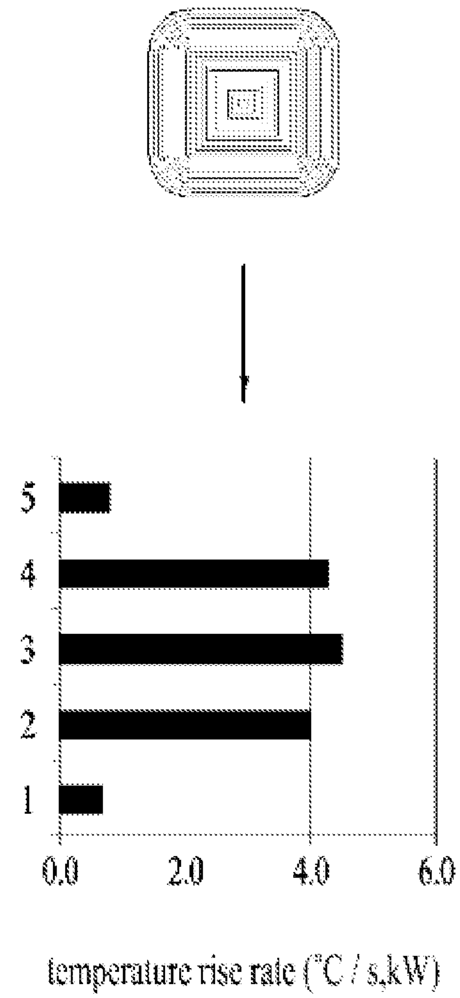

FIGS. 5A to 5C show the temperature distribution based on the location of the drum according to the coil shape.

FIGS. 5A to 5C show coils 5150 with different longitudinal lengths and the temperature distributions of the circumferential face of the drum 3000 based on the longitudinal dimension of the coil 5150.

In the graph, the vertical axis represents the position of the drum. '1' indicates a rear region of the outer circumferential face of the drum. '5' represents the front region of the outer circumferential face of the drum 3000, and '2 to 5' represents the regions therebetween. Further, the horizontal axis represents the temperature rise rate of drum 3000.

The longitudinal dimensions of the coil 5150 and the temperature rise rates of the drum 3000 as described below are based on the coils 5150 shown in FIGS. 5A to 5C and will be compared with each other. FIG. 5A shows the case where the drum is heated using the coil with the largest longitudinal dimension. FIG. 5B shows the case where the drum is heated using a coil with a medium dimension of the longitudinal dimension. FIG. 5C shows the case where the drum is heated using the coil with the smallest longitudinal dimension.

FIG. 5A shows a uniform temperature rise rate between the front and rear and center regions of drum 3000 as compared to other coils. In FIG. 5A, the difference in the temperature rise rate between the front and rear regions and the central region of drum 3000 may be significant. The coil of FIG. 5B has a relatively large temperature rise rate difference therebetween.

That is, assuming that the transverse dimensions of the coils 5150 are the same, it may be seen that the as the longitudinal dimension of the coil 5150 increases, the front and rear regions and the central region of the drum 3000 may be heated more uniformly. That is, it is preferable that a long axis of the coil of the ellipse or track shape extends in the front and rear direction of the tub.

This may be applied to a case where the coil 5150 is provided on the outer circumferential face of the tub 2000. In this case, as the longitudinal ends B1 and B2 of the coil 5150 are closer to the front and rear regions of the tub 2000 respectively, the circumferential face of the drum 3000 inside the tub 2000 may heated more uniformly.

Further, when the outermost wire of the transverse straight portions 5156 and 5157 extends to the front and rear regions of the tub 2000, the drum 3000 may be heated more uniformly. However, in this case, the magnetic field will extend too far into the front and rear regions of the tub 2000 to heat other components of the laundry treating apparatus, such as the driver 4000 or door 6000. There arises a problem of damaging the laundry treating apparatus 1.

Further, in the laundry treating apparatus 1 in which the rear region of the tub 2000 is inclined inside the cabinet 1000, the tub 2000 oscillates up and down, thereby causing interference between the front upper corner of the induction module 5000 and the top face of the cabinet 1. Thus, the induction module 5000 and cabinet 1000 may be damaged. To prevent this situation, the height of the cabinet 1000 may increase. However, in this case, there occurs limitation that the compact structure of the laundry treating apparatus cannot be realized.

Accordingly, the outermost wire of the front straight portion 5156 is spaced apart from the frontmost region of the tub 2000 by a predetermined distance. The outermost wire of the rear straight portion 5157 is spaced a predetermined distance from the rearmost region of the tub 2000. The predetermined spacing may be preferably in a range of 10 to 20 mm.

The above-described configuration prevents the components other than the drum 3000 from being unnecessarily heated, or prevents interference between the induction module 5000 and the top face of the cabinet 1000 while uniformly heating the outer circumferential face of the drum 3000.

Further, the length of the outermost wire of the longitudinal straight portion 5155 of the coil 5150 is preferably larger than the length of the outermost wire of each of the transverse straight portions 5156 and 5157.

This prevents the magnetic field from being radiated to an excessive distance in the circumferential direction of the drum 3000 so as not to heat the components other than the drum 3000, and secures a space for arranging a spring or other structures that may be provided on the outer circumferential face of the tub 2000.

In this connection, a face on which the wire 5151 may be wound to form the coil 5150 may be a curved face corresponding to the circumferential face of the drum 3000. In this case, the flux density of the magnetic field toward the drum 3000 can be further increased.

Further, when the induction module 5000 is operated, it is preferable to rotate the drum 3000 to uniformly heat the circumferential face of the drum 3000.

Further, the magnetic field generated by the coil 5150 is radiated toward the drum 3000 having a high permeability, while the magnetic field is also partially emitted in the opposite direction to the direction toward the drum 3000, to the front and rear regions thereof and to the left and right sides to the coil 5150.

Therefore, it is necessary to concentrate the magnetic field generated by the coil 5150 only in the direction toward the drum 3000. For this purpose, the induction module 5000 may include a permanent magnet 5130.

Referring to FIGS. 3A and 3B, an embodiment of the permanent magnet and the arrangement of the permanent magnet will be described.

The permanent magnet 5130 acts as a blocking member to prevent the other components than the drum 3000 from being heated. The magnetic field generated by the coil 5150 is concentrated only in the direction toward the drum 3000 to increase the heating efficiency.

As shown in FIGS. 3A and 3B, the permanent magnet 5130 may be embodied as a bar magnet. It may be preferable that the permanent magnet 5130 is disposed on the coil 5150 and is oriented in a perpendicular manner to the longitudinal direction of the coil 5150. This is intended to cover the inner and outer coils at the same time.

The permanent magnet 5130 may have a plurality of bar magnets of the same size. The plurality of permanent magnets 5130 may be spaced apart from each other along the longitudinal direction of the coil 5150.

This is because when a permanent magnet 5130 is placed only at a specific position, the amount of the magnetic field radiated to the drum 3000 may vary between the parts of the circumferential face of the drum 3000, thereby making it difficult to uniformly heat the drum. Therefore, in order to uniformly direct the magnetic field generated in the coil 5150 in the direction toward the drum 5150, it may be preferable that the plurality of the permanent magnets 5130 are arranged to be spaced apart from each other along the circumference of the coil 5150.

Further, when the number of permanent magnets 5130 is fixed, it may be preferable to concentratively arrange the permanent magnets 5130 in the front and rear portions of the tub 2000 and on the coil 5150.

Specifically, as shown in FIG. 3B, the coil 5150 may be divided into the coil longitudinal ends B1 and B2 including the coil front end B1 adjacent to the front region of the tub 2000 and the coil rear end B2 adjacent to the rear region of tub 2000, and the coil central region A located between the front end B1 and the rear end B2 and having an area larger than that of each of the coil front end B1 and the coil rear end B2. The permanent magnets 5130 may be arranged such that the number of the permanent magnets 5130 on the coil front end B1 or coil rear end B2 may be equal to or larger than the number of the permanent magnets 5130 on the coil central region A.

In the coil central region A, the magnetic field is radiated to extend to the left and right sides to the coil 5150. In this case, a width dimension of the drum 3000 is much larger than the transverse dimension of the coil central region A. Thus, it is possible to uniformly heat the drum 3000 in the transverse direction without arranging a large number of permanent magnets.

On the other hand, in the coil front end B1 and the coil rear end B2, the magnetic field is radiated to extend to the left and right sides to the coil 5150. Further, in the coil front end B1, the field is emitted to the front region of the drum 3000. In the coil rear end B2, the field is emitted to the rear region of the drum 3000.

Further, in the coil front end B1 and coil rear end B2, the coil density is relatively small. That is, due to the round shape of the corner portion, the density of the coil must be reduced at the longitudinal ends thereof. This is because the coil cannot extend theoretically linearly at the corner thereof.

Therefore, when the number of permanent magnets is fixed and the permanent magnets are arranged in the coil front end B1, the coil rear end B2, and the coil central region A, respectively, the nonuniform heating problem in the longitudinal direction of the drum 3000. may occur.

Therefore, when the number of permanent magnets 5130 is fixed, it is more desirable to concentrate the arrangement of the permanent magnets 5130 on the longitudinal ends B1 and B2 rather than on the central region A of the coil. That is, it is also possible to uniformly heat the front and rear region of the drum. That is, in the embodiment shown in FIG. 3B, the drum may be heated more uniformly to improve heating efficiency than in the embodiment shown in FIG. 3A.

In other words, the magnetic flux density of the coil longitudinal ends B1 and B2 is increased via the concentration of the arrangement of the permanent magnets thereon. As a result, the drum 30 is uniformly heated in the longitudinal direction thereof.

Specifically, the embodiment shown in FIG. 3B may be more efficient than the embodiment shown in FIG. 3A under the same conditions. Further, when the number of permanent magnets 5130 is fixed, it may be efficient that the permanent magnet 76 on the central region A is displaced onto the longitudinal ends B1 and B2. Therefore, when the total magnetic flux density based on the arrangement of the permanent magnets is determined, it is desirable that the magnetic flux density on the longitudinal ends B1 and B2 be greater than the magnetic flux density on the central region A.

The embodiment of the winding pattern of the coil 5150 and the embodiment of the arrangement of the permanent magnets 5130 as described above are not contradictory to each other but may be implemented in the combined manner in a single laundry treating apparatus 1. In this case, the drum 3000 may be more uniformly heated than in the laundry treating apparatus 1 in which only each of the embodiment of the winding pattern of the coil 5150 and the embodiment of the arrangement of the permanent magnets 5130 as described above is implemented.

Further, when the drum 3000 is rotated in the washing or drying process, vibration is transmitted to the tub 2000. Thus, the structures mounted on the tub 2000 will also vibrate together with the drum. In the laundry treating apparatus 1, problems such as increased noise or deteriorated durability may arise.

Further, when the tub 2000 vibrates, the coil 5150 installed on the tub 2000 may vibrate, thereby causing the coil 5150 to be removed therefrom or noise to be generated. Therefore, it is desirable that the coil 5150 be firmly mounted on the tub 2000 so that the above problem may be solved. For this purpose, the coil 5150 is preferably installed on the tub 2000 using an induction module 5000.

Figure 7:
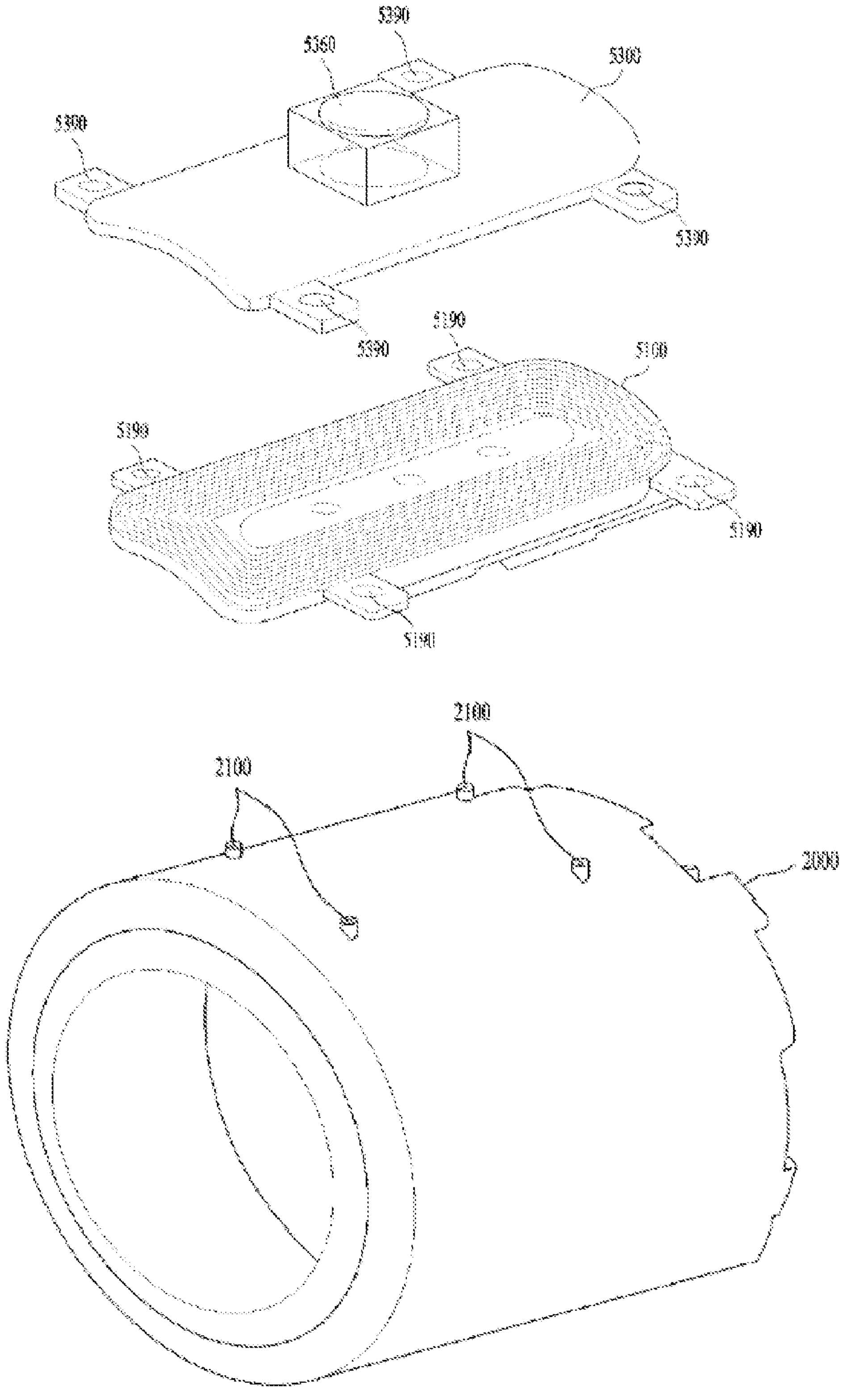
FIG. 7 is a perspective view showing a coupling relationship between a tub, a base housing and a cover.

Referring to FIG. 7, the induction module 5000 is described.

The induction module 5000 serves as a fixing member for fixing the coil 5150 to the outer circumferential face of the tub 2000. The induction module 5000 may include a base housing 5100 mounted on the outer circumferential face of the tub 2000 to prevent the coil 5150 from being removed from the tub 2000 even when the tub 2000 vibrates.

Figure 6A:
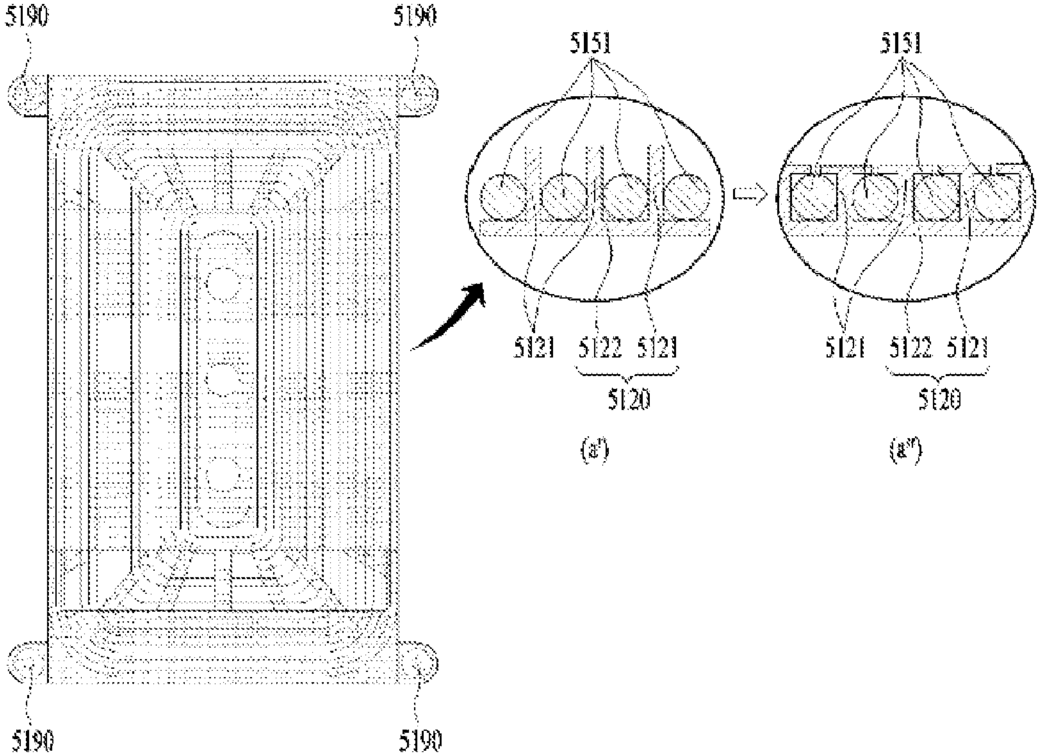
FIGS. 6A and 6B show top and bottom views of the base housing.
Figure 6B:
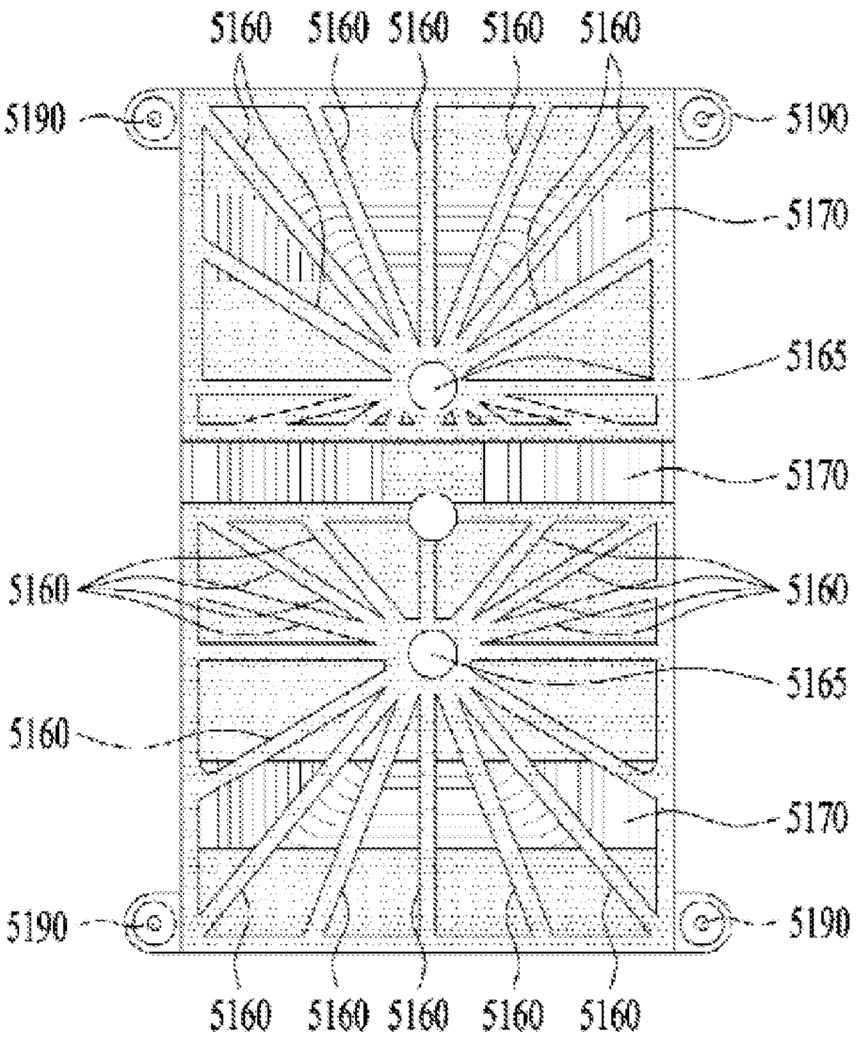

FIG. 7 shows a state in which the base housing 5100 is mounted on the tub 2000. FIG. 6A shows a top face of the base housing 5100. FIG. 6B shows a bottom face of the base housing 5100.

First, referring to FIGS. 6A and 6B, the base housing 5100 will be described.

As shown in FIG. 6A (a') and FIG. 6A (a"), the base housing 5100 has a coil slot 5120 that is narrower than the diameter of the wire 5151 such that the wire 5151 of the coil 5150 is press-fitted into the slot and thus is constrained therein. In this connection, the width dimension of the coil slot 5120 may be set to be 93% to 97% of the wire diameter of the wire 5151.

When the wire 5151 is press-fitted into and then constrained in the coil slot 5120, the wire 5151 is fixed inside the coil slot 5120 even when the tub 2000 vibrates, so that the coil 5150 does not move.

Therefore, the coil 5150 is not removed from the coil slot 5120 and the movement of the coil itself is suppressed. This may prevent noise which may be otherwise caused due to the presence of a clearance therebetween.

Further, the coil slot 5120 may be defined by a plurality of fixing ribs 5121 protruding upwards from the base housing 5100. The height of the fixing rib 5121 may be larger than the diameter of the coil 5150.

The height of the fixing rib 5121 may be larger than the wire diameter of the coil 5150 so that both side faces of the coil 5150 sufficiently contact the inner wall of the fixing rib 5121. This feature is also related to a melting treatment of the top portion of the fixing rib 5121 as described below.

Using the above-described feature, the fixing rib 5121 may separate the adjacent wires 5151 from each other to prevent electrical short. Thus, it is not necessary to apply a separate insulating film to the wire 5151. In an alternative, the thickness of the insulating film can be minimized, thereby reducing the production cost.

Further, the top of the fixing rib 5121 may be constructed such that the wire 5151 is inserted into the slot and then the top of the rib 5121 is melted to cover the top of the coil 5150. That is, the top of the fixing rib 5121 may be subjected to the melting treatment.

In this connection, the height of the fixing rib 5121 is preferably 1 to 1.5 times as large as the wire diameter of the wire 5151 so as to cover the top of the coil 5150 upon the melting treatment of the rib.

Specifically, referring to FIG. 6A (a"), After the wire is press-fitted in the slot, the fixing rib 5121 may be melted while the top face thereof is pressed down. Then, as in FIG. 6A (a"), a portion of the molten fixing rib 5121 may collapse down to cover the tops of both wires 5151. In this connection, it is preferable that each fixing rib 5121 between the adjacent wires 5151 is melted to completely shield the top of the wire 5151 in the coil slot 5120, or is melted to define a gap narrower than the wire diameter of the wire 5151 on the top of the wire.

In another embodiment, the coil slot 5120 may be melted to cover not both adjacent wires but only one wire 5151. In this case, each of all of the fixing ribs 5121 may be melted to cover only an inner wire 5151 among the both adjacent wires 5151 or to cover only an outer wire 5151 among the both adjacent wires 5151.

In addition to press-fitting the coil 5150 into the coil slot 5120, the melting treatment of the top portion of the fixing rib 5121 may be carried out. This is intended to physically block a path along which the wire 5151 may move and to suppress the movement of the wire 5151 to prevent noise which may be otherwise caused by the vibration of the tub 2000 and to remove the clearance between the parts such that durability can be improved.

The coil slot 5120 may be defined by a slot base 5122 on which the coil 5150 is seated. The fixing rib 5121 extends upwards from the slot base.

The slot base 5122 may extend in a continuous manner as described in FIG. 6A (a"). The coil 5150 is pressurized and fixed by the combination of the slot base 5122 and the fixing rib 5121 which is subjected to the melting treatment.

In another example, the slot base 5122 may be partially open. In this connection, an opening defined in the slot base 5122 may be referred to as a through-hole 5170.

In the above description, it is provided that the coil 5150 is formed on the top face of the base housing 5100. However, the present disclosure is not limited thereto. The fixing rib 5151 may protrude downwards from the base housing 5100 so that the coil 5150 is disposed on the bottom face of the base housing 5100. In this case, even when a separate through-hole is not formed in the slot base 5122, the gap defined by the melting-treated fixing ribs 5121 serves as the through-hole.

FIG. 6B shows the bottom face of the base housing 5100. As shown in the figure, the bottom face of the base housing 5100 may have a through-hole 5170 defined therein penetrating the top face thereof. The through-hole 5170 has an open structure through which the coil 5150 faces the outer circumferential face the tub 2000. Thus, the through-hole 5170 may be formed along the winding pattern of the wire 5151.

When the wire 5151 extends along a wound shape, it is also possible to increase the heating efficiency by radiating the magnetic field smoothly from the wire 5151 to the drum 3000, and to allow air to flow along the opened face, to obtain the advantage that the overheated coil 5150 may cool rapidly.

Further, as shown in FIG. 6B, a base supporting bar 5160 extend to intersect the through-hole may be disposed on the bottom face of the base housing 5100. The base housing 5100 may include the base supporting bar 5160.

The base supporting bar 5160 may extend radially about each of both fixing points 5165 around the central region A of the base housing 5100 so as to enhance the adhesion between the outer circumferential face of the tub 2000 and the base housing 5100.

When a base fastening portion 5190 disposed on each of both sides of the base housing 5100 is fixed to a tub fastening portion 2100 disposed on the outer circumferential face of the tub, the outer circumferential face of the tub 2000 is pressed by the base supporting bar 5160. Thus, the base housing may be more strongly supported than when an entirety of the bottom face of the base housing 5100 contacts the outer circumferential face of the tub 2000. (See FIG. 7). Accordingly, even when the tub 2000 vibrates, the base housing 5100 cannot easily move or detach from the outer circumferential face of the tub 2000.

Further, in order to improve the fastening force between the base housing 5100 and the outer circumferential face of the tub 2000, the base housing 5100 may have a curved surface corresponding to the outer circumferential face of the tub 2000. Further, on the top face of the base housing 5100 on which the wire 5151 is wound, the curved portions of the fixing ribs 5121 may have the same radius of curvature (see FIGS. 3A and 3B) in a corresponding manner to a feature that the curvature radii of the coil curved portions 5153 as described above are equal to each other.

Further, as shown in FIG. 7, the induction module 5000 may further include a cover 5300 coupled with the base housing 5100 to cover the coil slot 5120.

The cover 5300 is constructed to be coupled to the top face of the base housing 5100, as shown in FIG. 7. The cover acts to prevent the coil 5150 and permanent magnet 5130 to be removed from the induction module.

Specifically, the bottom face of the cover 5300 may be in close contact with the top of the coil slot 5120 of the base housing 5100. Accordingly, the movement of the cover 5300 itself may be prevented.

Figure 8A:
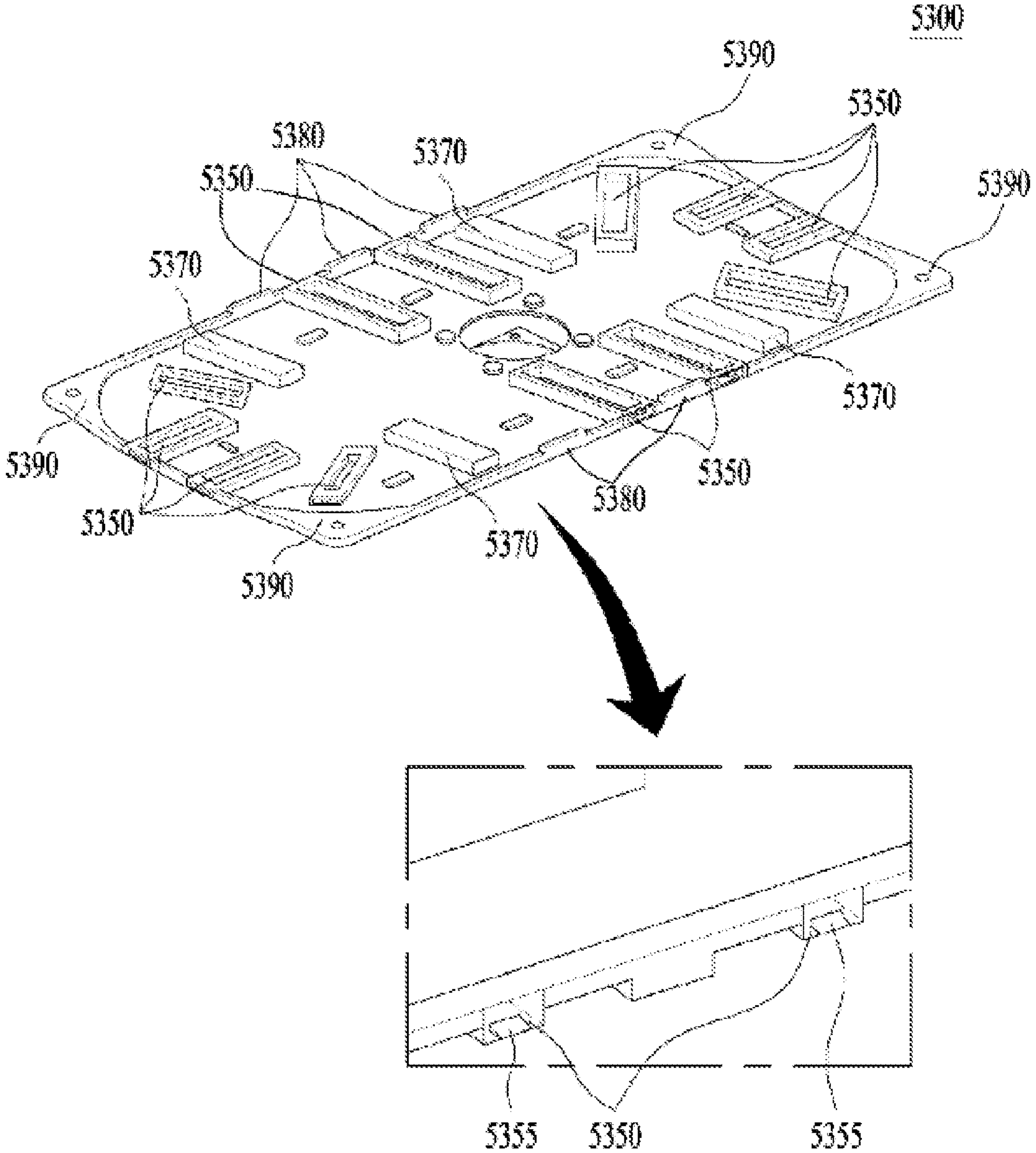
FIG. 8A is a back view and side view of the cover.
Figure 8B:
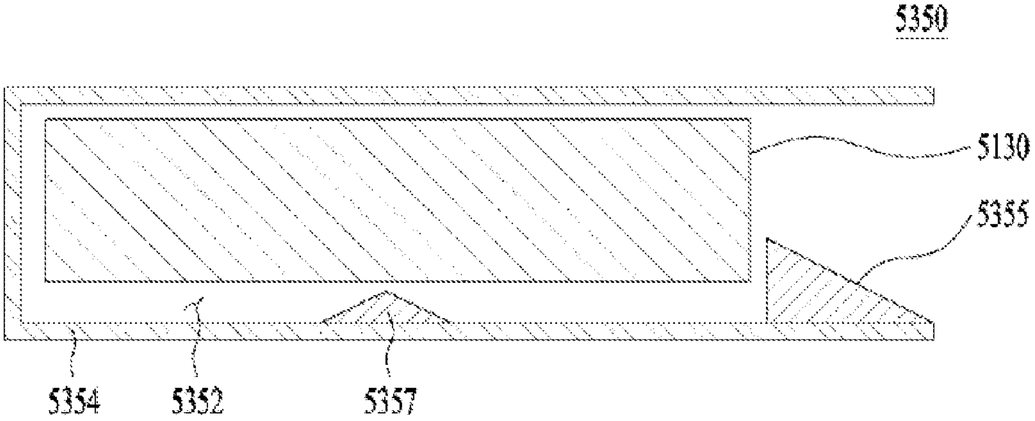
FIG. 8B shows a cross sectional view of a permanent magnet mount.

Referring to FIGS. 8A and 8B, the cover 5300 is described in detail.

Referring to FIG. 8A, a plurality of reinforcing ribs 5370 protruding downwards from the bottom face of the cover 5300 may be provided. The reinforcing ribs 5370 and the top of the coil slot 5120 may be in close contact with each other.

When the bottom face of the reinforcing rib 5370 is in close contact with the coil slot 5120, more concentrated pressure may be applied to a small area than when the entirety of the bottom face of the cover 5300 is in close contact with the top of the coil slot 5120.

As a result, the cover 5300 may be fixed more firmly to the outer face of the tub 2000. Thus, even when the vibration of the tub 2000 occurs, this does not cause noise or component deviation due to the clearance.

The reinforcing rib 5370 may include a plurality of reinforcing ribs arranged along the longitudinal direction of the coil 5150. Further, The reinforcing rib 5370 may extend in a perpendicular direction to the longitudinal direction of the coil 5150. Therefore, the reinforcing ribs 5370 may firmly fix the entire coil without pressing the entire coil.

In this connection, a spacing is required between the cover 5300 and the coil 5150 because it is desirable for air to flow therein for heat dissipation. Therefore, the reinforcing rib 5370 fills a portion of the spacing. Therefore, the fixing of the coil may be achieved at the same time as the air flow space is secured.

Further, the reinforcing rib 5370 is preferably integrally formed with the cover 5300. Thus, when the cover 5300 is coupled with the base housing 5100, the reinforcing rib 5370 presses the coil 5150. Therefore, separate means or steps for pressing the coil 5150 becomes unnecessary.

Further, the permanent magnet 5130 may be interposed between the base housing 5100 and the cover 5300. The cover 5300 may have a permanent magnet mount 5350 into which the permanent magnet 5130 is inserted. Accordingly, when the permanent magnet 5130 is fixed to the cover 5300, the permanent magnet may be fixed to a top of the coil 5150 as the cover 5300 is coupled to the base housing 5100.

The permanent magnets 5130 may be preferably disposed at specific locations on the top face of the coil 5150 respectively to efficiently concentrate the direction of the magnetic field into the direction toward the drum 3000. Thus, when the permanent magnet 5130 moves according to the vibration of the tub 2000, there may be a problem that not only the noise occurs but also the heating efficiency is lowered.

Thus, the permanent magnet mount 5350 allows the permanent magnet 5130 to be fixed in a position at which the permanent magnet 5130 is initially disposed between the base housing 5100 and the cover 5300. Thus, it is possible to prevent the problem that the heating efficiency is lowered.

More specifically, the permanent magnet mount 5350 may have a bottom opening 5352 defined therein. The bottom opening may be defined by both side walls projecting downwards from the bottom face of the cover 5300 and facing away each other. The bottom face of the permanent magnet 5130 mounted in the permanent magnet mount 5350 may communicate with one face of the coil 5150 through the bottom opening 5352.

In this case, the left and right directional movement of the permanent magnet 5130 may be suppressed by the two side walls. Due to the presence of the bottom opening 5352, the permanent magnet 5130 may be closer to the top face of the coil 5150.

As the permanent magnet 5130 is closer to the coil 5150, the magnetic field is guided towards drum 3000 in a more concentrated manner. As a result, the stable and uniform heating of the drum 3000 may be realized.

In addition, the permanent magnet mount 5130 includes an inner wall 5354 protruding downward from the bottom face of the cover 5300 at one end of each of the two side walls. The permanent magnet mount 5130 includes a stopper 5355 to prevent the permanent magnet 5130 from being removed from the cover 5300. An opening may be defined between the inner wall 5354 and the stopper 5355. The permanent magnet 5130 may not be separated from the cover 5300 due to the stopper 5355.

The permanent magnet 5130 may be prevented from front-rear movement due to the inner wall 5354 and the stopper 5355. Thus, the stable and uniform heating of the drum 3000 may be achieved. Further, when the temperature of the permanent magnet 5130 is increased due to the overheated coil 5150, the heat from the permanent magnet 5130 may be discharged through the opening.

In this connection, the base housing 5100 may further include permanent magnet pressing means 5357 protruding upwards in the bottom opening 5352 to press the bottom face of the permanent magnet 5130. The permanent magnet pressing means 5357 may be embodied as a leaf spring or rubber based protrusion.

When the vibration is transmitted to the permanent magnet 5130 according to the vibration of the tub 2000, the permanent magnet 5130 may generate noise due to the clearance that may be formed between the underlying coil slot 5120 and the permanent magnet mount 5350.

Therefore, the permanent magnet pressing means 5357 prevents the problem of generating the noise by buffering the vibration. Further, the permanent magnet pressing means 5357 may remove the clearance to prevent the permanent magnet 5130 and the permanent magnet mount 5350 from being damaged due to the vibration.

Further, in order to improve the clamping force and to stably heat the drum 3000, the lower end of the permanent magnet mount 5350 may be constructed to be in close contact with the top of the coil slot 5120.

In this case, since the bottom face of the permanent magnet 5130 may be constructed closer to the coil 5150 as described above, the drum 3000 may be more uniformly heated. The bottom face of the permanent magnet 5130 function as the reinforcing rib 5370 to enhance the adhesion between the cover 5300 and the base housing 5100.

Additionally, when the base housing 5100 have a curved surface conforming to the outer circumferential face of the tub 2000, the cover 5300 may have a curved surface having the same curvature as that of the outer circumferential face of the tub 2000.

In another embodiment, the permanent magnet mount 5350 may be included in the base housing 5100.

The base housing 5100 may be formed such that the permanent magnet mount 5350 is disposed on a top face of the fixing rib 5121. In this connection, the permanent magnet pressing means 5357 may be formed on the bottom face of the cover 5300.

Referring to FIG. 7, a description is given of how the cover 5300 and the base housing 5100 are coupled to the tub 2000.

In FIG. 7, the fastening configuration between the tub 2000, base housing 5100 and cover 5300 is disclosed. Referring to FIG. 7, the tub 2000 includes the tub fastening portion 2100. The base housing 5100 includes the base fastening portion 5190. The cover 5300 includes a cover fastening portion 5390.

The tub fastening portion 2100 has a tub fastening hole. The base fastening portion 5190 has a base fastening hole. The cover fastening portion 5390 has a cover fastening hole. All of the fastening holes may have the same length diameter. Thus, a single screw may pass through the holes to fasten the tub 2000, base housing 5100 and cover 5300 with each other at the same time.

Therefore, it is possible to easily assemble the tub, the base housing and the cover in the manufacturing process and to reduce the production cost.

In addition, in order to secure the fastening space when the longitudinal ends B1 and B2 of the coil are adjacent to the front and rear regions of the tub 2000, the tub fastening portion 2100, the base fastening portion 5190, and the cover fastening portion 5390 are positioned such that the fastening points are present at both sides to the coil 5150.

Further, as shown in FIGS. 8A and 8B, the cover 5300 may further include a cover mounting rib 5380 protruding downward at both side edges of the cover. The rib 5380 allows the cover 5300 to be easily fitted into the base housing 5100 and prevent the left and right directional movement of the cover 5300.

Further, as shown in FIG. 7, the cover 5300 may have a fan mount 5360. The fan mount 5360 may be formed at the center of the cover 5300.

Air may be introduced into the cover 5300, that is, the induction module, through the fan mount. Since a space is formed between the cover 5300 and the base housing 5100 in the induction module, a flow space of air is formed. Further, a through-hole is formed in the base housing. Thus, the air may cool the coil 5150 in the internal space and be discharged outside the induction module through the through-hole of the base housing.

Herein, the example in which the induction module 5000 is formed on the outer circumferential face of the tub 2000 has been discussed. However, the present disclosure is not limited thereto. It is not excluded that the induction module 5000 is formed on the inner circumferential surface of the tub 2000. In an alternative, the induction module 5000 may form a portion of the circumferential face of the outer wall of the tub 2000.

In this connection, the induction module 5000 is preferably located as close as possible to the outer circumferential face of the drum 3000. That is, the magnetic field generated by the induction module 5000 is significantly reduced as the distance between the drum and the coil increases.

Figure 9:
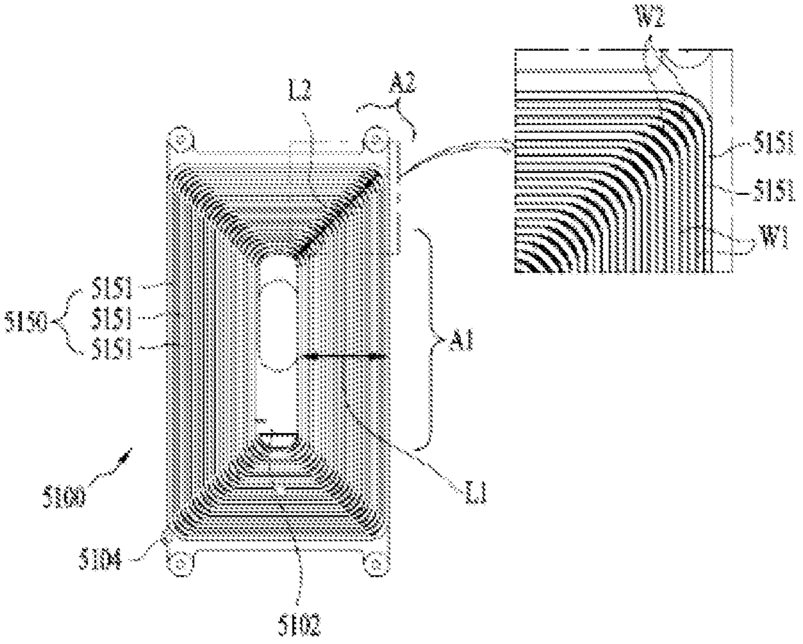
FIG. 9 is a top view of another embodiment of the base housing.

Referring to FIG. 9, another embodiment of the base housing 5100 will be described as follows.

Vibrations occur during operation of the laundry treating apparatus. In particular, vibration occurs in washing and dehydration processes and these vibrations are transmitted to the tub. Therefore, vibration is transmitted to the coil installed on the tub. Therefore, it is desirable to prevent the coil from being detached from the induction module installed in the laundry treating apparatus by vibration. In this embodiment, the structure of the base housing 5100, which can effectively prevent the detachment of the coil, is proposed.

As described above, in order to uniformly heat the drum, the shape of the coil 5150 is preferably quadrangle and more preferably rectangular or square. Further, the base housing 5100 accommodating the coil 5150 therein has preferably a shape corresponding to the shape of the coil 5150. That is, the shape of the base housing 5100 is preferably rectangular.

A method by which the coil 5150 is installed on the base housing 5100 will be described.

Basically, the wire 5151 is coiled in a rectangular shape on the base housing 5100 to form the coil 5150. This coiling will be explained as follows.

The base housing 5100 has an inlet 5102 and an outlet 5104. The inlet 5102 is constructed near the center of the base housing 5100, while the outlet 5104 is disposed at the edge of the base housing 5100. The wire 5151 is drawn into the inlet 5102 of the base housing 5100 and is sequentially wound in the direction toward the edge. The wire 5151 is finally drawn out of the base housing 5100 through the outlet 5104 of the base housing 5100. Finally, the shape of the coil 5150 composed of the turns of the wire 5151 is approximately rectangular.

Further, as shown in FIGS. 6A and 6B, in order to coil the wire 5151 on the base housing 5100, the ribs 5121 protruding upwards are arranged on the base housing 5100 at a predetermined spacing. The slot 5120 accommodates the wire 5151. The slot may be defined between the rib 5121 and the neighboring rib.

Once the wire 5151 has been wound, thermal-fusing of the top portion of the rib 5121 may be carried out to prevent the wire 5151 from being detached from the slot 5120. That is, when the top portion of the rib 5121 is melted while being pressed, the top portion of the rib 5121 collapses to be extended laterally to block all or part of the open top of the slot 5120. Thus, the molten portion of the rib 5121 prevents the wire 5151 from being detached from the slot 5120.

As described above, the top portion melted by the thermal-fusing of the rib 5121 prevents the wire 5151 from being detached from the slot. Therefore, it is preferable that the molten amount by the thermal-fusing of the rib 5121 is large in view of preventing the deviation of the wire 5151.

Referring to FIG. 9, the thermal-fusing will be described.

As described above, the wire 5151 is wound on the quadrangular base housing 5100. The shape of the coil 5150 defined as the winding of the wire has a rectangular shape. Further, when winding the wire 5151, it is desirable that the turn of the wire 5151 have a constant curvature while the spacing between the adjacent wire 5151 and wire 5151 is kept constant.

In the straight section A1 of the base housing 5100, the wire 5151 extends in a straight line. In a corner section A2 of the base housing 5100, the wire 5151 is bent at an angle of about 90 degrees.

A principle by which the geometry of the windings of the wire is used to prevent the detachment of the coil will be described.

The diagonal dimension L2 of the corner section A2 of the base housing 5100 is greater than the width L1 of the straight section A1. In this connection. substantially the same number of wires 5151 are wound on between the corner section A2 of the base housing 5100 and the straight section A1 thereof.

Thus, the spacing W2 between the wire 5151 and the adjacent wire at the corner section A2 is greater than the spacing W1 between the wire 5151 and the adjacent wire at the straight section A1. In this connection, the rib may be positioned in the spacings W1 and W2 between the neighboring wires 5151.

Thus, using this geometric characteristics, the thickness of the rib in the corner section A2 may be larger than that in the straight section A1. Thus, the spacing W1 between the adjacent wires 5151 in the straight section A1 may be kept constant while the thickness W2 of each of the ribs in the corner section A2 may be large.

Increasing the thickness W2 of each of the ribs in the corner section A2 may increase the amount as molten by the thermal-fusing of the rib in the corner section A2. Therefore, the detachment of the wire 5151 from the module may be more effectively prevented.

Figure 10:
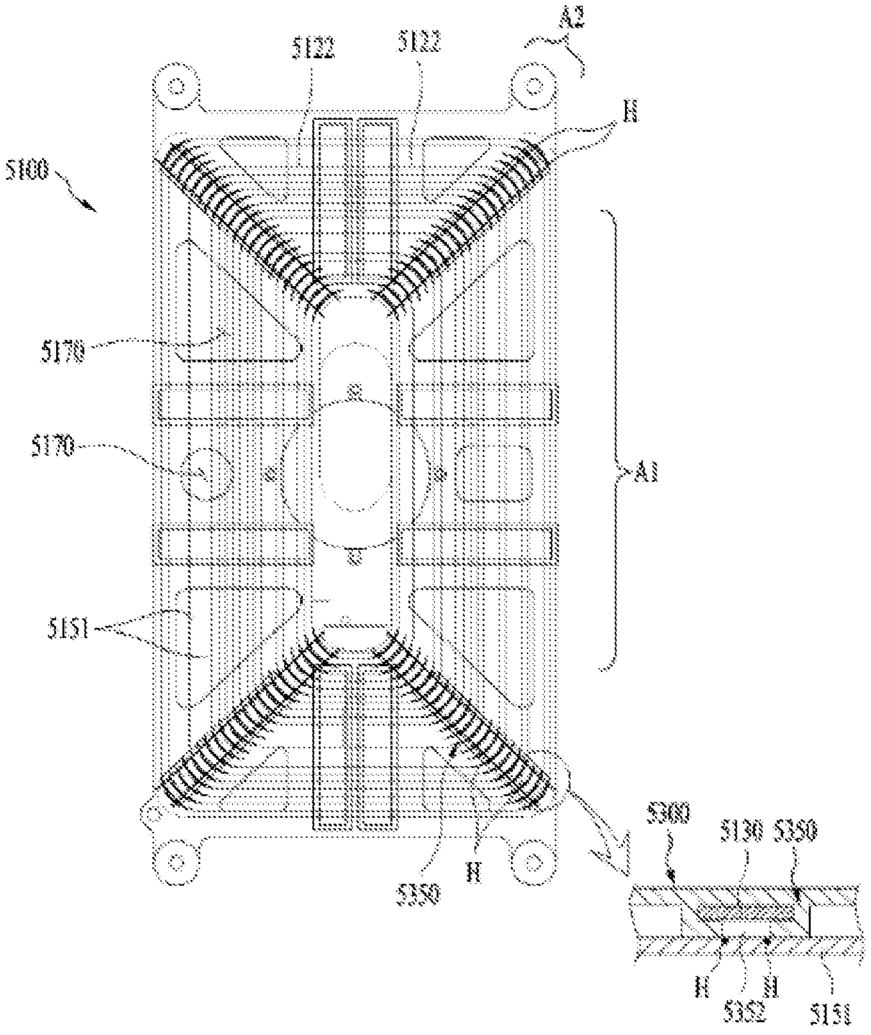
FIG. 10 is a bottom view of FIG. 9.

Referring to FIG. 10, a thermal-fused region will be set forth as follows.

The thermal-fused region of the rib 5121 to effectively prevent the removal of the coil 5150 from the base housing 5100 will be described.

The base housing 5100 has a rectangular shape. The base housing 5100 is wound by the wire 5151. In the corner section A2, the wire 5151 is bent around 90 degrees. Therefore, in the corner section A2, as the wire 5151 is bent, the spacing between the wire 5151 and the base housing may be larger in the corner section A2. It is therefore desirable to prevent the detachment of the wire 5151 from the housing in the corner section A2.

The details of the prevention of the removal of the coil from the housing will be described below.

The base housing 5100 includes the slot base 5122 from which the rib 5121 protrudes. Further, the base housing 5100 preferably has the through-hole 5170. That is, the entirety of the base housing 5100 may not define the slot base 5122. In other words, the portion of the base housing 5100 may define the slot base 5122. Further, it is preferable that the through hole 5170 is formed at portions of the base housing other than the slot base 5122.

The slot base 5122 may preferably define a portion of the housing corresponding to a portion where the permanent magnet 5130 is installed. Further, through the through-hole 5170, the heat generated from the coil 5150 may flow out.

As described above, the coil may be most easily detached from the housing in the corner section A2 of the base housing 5100. Therefore, it is particularly desirable to thermally fuse the rib 5121 in the corner section A2 of the base housing 5100. Further, in the corner section A2, it is more desirable to perform thermal-fusing of two rows of the ribs H radially extending from the center to the edge.

More specifically, in the corner section A2, a thermal-fusing line is defined along which that the thermal fusing means thermally fuses the rib 5121. The thermal-fusing line transverses the corner section A2. When the rib 5121 is subjected to the thermal-fusing, the wire may be secured to the base housing 5100.

The thermal-fusing line may extend in a direction outwardly in the corner section A2. Preferably, the thermal-fusing line may extend in a direction radially and outwardly in the corner section A2.

Further, the corner section A2 is defined as a section connecting the transverse straight portions 5156 and 5157 and the longitudinal straight portion 5155. The corner section A2 has a start point as an end of one of the transverse straight portion 5156, and 5157 and the longitudinal straight portion 5155 and has an end point as an end of the other of the transverse straight portion 5156, and 5157 and the longitudinal straight portion 5155.

The thermal-fusing line may extend between the start and end points of the corner section A2. That is, as the base housing 5100 has the geometric shape having the corner, the coil detachment phenomenon occurs frequently in the corner section A2. Thus, forming the thermal-fusing line in the corner section A2 may allow the coil to be prevented from being raised up.

In one example, the permanent magnet 5130 is located on the coil in the corner section A2 of the base housing 5100. It is more desirable to perform the thermal-fusing of the rib along the longitudinal direction of the permanent magnet 5130 in the corner section A2 of the base housing 5100. It is further preferable to thermally-fuse the rib along the inner space of the permanent magnet mount 5350, that is, the bottom opening 5352. This is because the thermal-fusing in this way can ensure sufficient heat-fused amount of the rib 5121 due to the large thickness of the rib in the corner section A2.

Further, even when the thermal-fusing is performed in the straight section A1 of the base housing 5100, the thermal-fusing is preferably performed along the longitudinal direction of the permanent magnet 5130. It is more preferable to perform the thermal-fusing of the rib along the inner space of the permanent magnet mount 5150.

The thermal-fusing may be performed by inserting the wire into the slot defined by the fixing ribs, melting the top portion of the rib to cover the top of the coil. For this reason, the base housing 5100 including the fixing ribs may be formed via plastic injection molding.

Further, when the wire is inserted into the coil slot, the top of the fixing rib may protrude above the top of the wire. In this connection, pressing down the heating plate on the top of the fixing rib causes the molten part of the fixing rib to collapse in a spread manner to the left and right sides. The molten part may spread laterally to the left and right to the fixing rib to fix the coil.

Thus, the top part of the fixing rib melts and collapses to cover the top opening of the coil slot (the opening through which the wire is inserted). The top opening is completely blocked or partially open. When the opening is partially open, the partial open portion is much smaller than the wire diameter of the wire, so that the wire may be prevented from being removed from the opening.

Further, the direction of collapse of the top portion of the fixing rib may be determined based on the direction of movement of the heating plate. As described above, when the plate is pressed downward, the melted portion of one fixing rib collapses and spreads laterally to the right and left. Further, when the hot plate is moved to the left side while pressing downward the plate, the melted portion of the fixing rib may move to the left side and cover the top opening of the coil slot.

Further, although the configurations have been described with reference to the embodiments shown in the drawings, the present invention may be embodied in other forms without departing from the spirit and scope of the present invention. The other forms may should be regarded as belonging to the scope of the present disclosure.

What is claimed is:

1. A laundry treating apparatus comprising:

a cabinet;

a drum made of a metal material and disposed into the cabinet, wherein the drum receives a laundry therein; and an induction module spaced apart from an outer circumferential face of the drum by a predetermined spacing, wherein the induction module has a coil formed by turns of a wire, wherein the induction module inductively heats the drum using a magnetic field generated by applying a current to the coil, wherein the induction module includes a rectangular shaped base housing for accommodating the coil, wherein the base housing has straight sections and corner sections, wherein the base housing includes ribs protruding upwards from the base housing and formed in the straight sections and the corner sections to define a slot for accommodating the coil therein, wherein a thickness of each of the ribs in each corner section is greater than a thickness of each of the ribs in each straight section.

2. The laundry treating apparatus of claim 1, wherein a thermal-fusing line for thermally fusing the ribs is defined in each of the corner sections, wherein the thermal-fusing line extends across each corner section.

3. The laundry treating apparatus of claim 2, wherein the thermal-fusing line extends radially across each corner section.

4. The laundry treating apparatus of claim 3, wherein the thermal-fusing line extends between start and end points of each corner section.

5. The laundry treating apparatus of claim 2, wherein the induction module includes a permanent magnet disposed on a top face of the coil, wherein the thermal-fusing line extends in a length direction of the permanent magnet.

6. The laundry treating apparatus of claim 5, wherein the thermal-fusing line extends along an inner space of a permanent magnet mount in which the permanent magnet is received.

7. The laundry treating apparatus of claim 2, wherein the base housing includes:

a slot base on which the coil is seated;

the ribs extending upwards from the slot base, wherein the slot is defined by the slot base and the ribs.

8. The laundry treating apparatus of claim 7, wherein a protruding height of each of the ribs is larger than a thickness of the coil.

9. The laundry treating apparatus of claim 7, wherein a spacing between neighboring ribs is smaller than a diameter of the wire such that the wire is press-fitted into the spacing.

10. The laundry treating apparatus of claim 1, wherein the straight sections include:

transverse straight portions including a front straight portion adjacent to a front of the outer circumferential face of the drum and a rear straight portion adjacent to a rear of the outer circumferential face of the drum; and longitudinal straight portions extending perpendicularly to the transverse straight portions, wherein each corner section is configured to form a curved portion extending between each of the transverse straight portions and each of the longitudinal straight portions.

11. The laundry treating apparatus of claim 10, wherein the wire of the coil at each corner section has a constant curvature.

12. The laundry treating apparatus of claim 11, wherein a diagonal length (L2) at each corner section is greater than a width (L1) of each straight section.

13. The laundry treating apparatus of claim 12, wherein the thickness of the ribs is increasing from an end of each straight section to a center of the ribs at each corner section so that the curvature of the wire at the corner section keeps constant.

14. The laundry treating apparatus of claim 12, wherein the base housing includes base fastening portions extending outwardly from both sides of the base housing to fix the base housing to the outer circumferential face of the drum such that a predetermined spacing is maintained therebetween.

15. The laundry treating apparatus of claim 14, wherein each of the base fastening portions protrudes outwardly from each of both sides of the base housing, wherein each base fastening portion has a base fastening hole into which a fastener is inserted.

16. The laundry treating apparatus of claim 13, wherein a length of curvature of the ribs in the corner sections keeps constant in a diagonal dimension from an inner portion to an outer portion of the coil.

17. The laundry treating apparatus of claim 11, wherein the induction module includes a permanent magnet disposed on a top face of the coil, wherein the permanent magnet is oriented to be perpendicular to a length direction of the coil to concentrate direction of the magnetic field generated by the coil onto a direction toward the drum.

18. The laundry treating apparatus of claim 17, wherein the permanent magnet includes a plurality of permanent magnets arranged to be spaced apart from each other in a length direction of the coil.

19. The laundry treating apparatus of claim 18, wherein the plurality of permanent magnets include rod shaped magnets having the same length, wherein the coil includes:

longitudinal ends including a front end adjacent to a front of the drum and a rear end adjacent to a rear of the drum; and a central portion located between the longitudinal ends, wherein an area of the central portion is larger than areas of the front and rear ends, wherein the plurality of permanent magnets are arranged such that a number of the permanent magnets in the front end or rear end is larger than or equal to a number of the permanent magnets in the central portion.

20. The laundry treating apparatus of claim 16, wherein a length of an outermost wire in the transverse straight portions and the longitudinal straight portions is greater than a length of an innermost wire respectively in the transverse straight portions and the longitudinal straight portions.

* * * * *